(No Model.)
B. M. O'NEILL.
ROOFING SLATE FASTENING.
No. 299,842. Patented June 3, 1884.
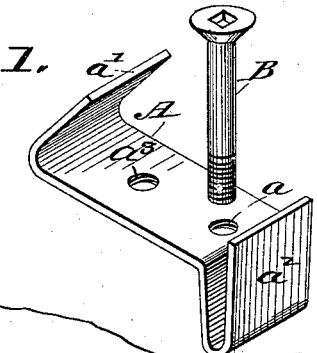
Fig. 1.
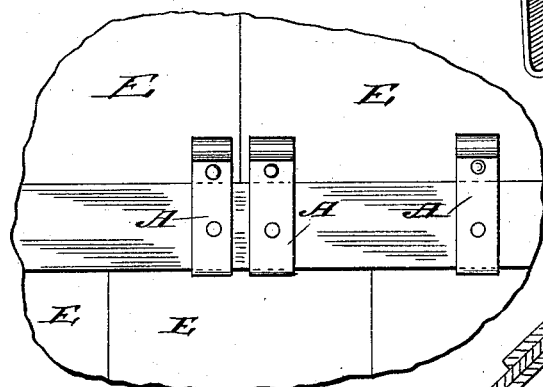
Fig. 2.
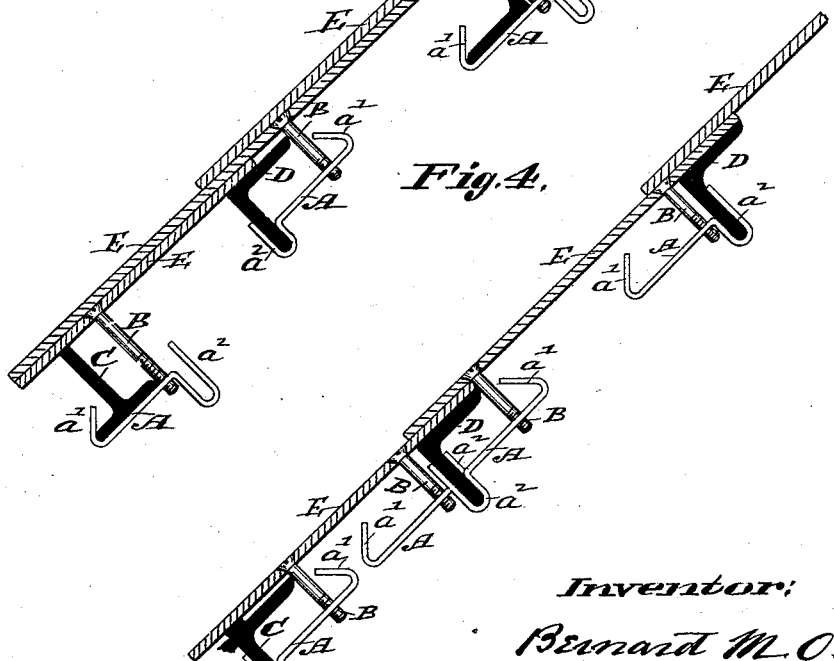
Fig. 3.
Fig. 4.
Attest:
Charles Pickle
C. E. Hunt
Inventor:
Bernard M. O'Neill
by C. D. Moody,
atty

UNITED STATES PATENT OFFICE.

BERNARD M. O'NEILL, OF ST. LOUIS, MISSOURI.

ROOFING-SLATE FASTENING.

SPECIFICATION forming part of Letters Patent No. 299,842, dated June 3, 1884.

Application filed March 7, 1884. (No model.)

*To all whom it may concern:*

Be it known that I, BERNARD M. O'NEILL, of St. Louis, Missouri, have made a new and useful Improvement in Roofing-Slate Fastenings, of which the following is a full, clear, and exact description, reference being had to the annexed drawings, making part of this specification, in which—

Figure 1 is a view in perspective of the improved fastening; Fig. 2, a bottom view showing a portion of the roof having the improvement; Fig. 3, a vertical section of the roof; and Fig. 4, a similar section, a single layer only of slate being used.

The same letters of reference denote the same parts.

The present improvement is designed for what are termed "metal roofs." By means of the improvement the operation of attaching the slates to the laths is greatly facilitated. An additional feature is making the fastening so that it can be interchangeably used upon either a T or an L shaped lath, and also so that it can be used upon the same lath in whichever position the lath may be arranged with relation to the slates.

A slate-fastening for a metal roof has hitherto consisted of a bolt, a nut, and a plate. The plate is adapted to hook against the under side of the lath, and the bolt is passed down through the slate and through the plate, and the slate, lath, and plate are fastened together by means of the nut which is attached to the bolt and screwed up against the under side of the plate. With such a fastening the operation of attaching the slates is a very tedious one. In connecting the various parts of the fastening, the operator, after passing the bolt through the slate and plate, must not only, with one hand, attach the nut to the bolt while he is operating with the other hand to direct the bolt into the nut, but he must also retain his hold upon it until all of the parts are tightened in place, for the nut of itself will not remain stationary as the bolt is being screwed thereinto. Such operation, in view of the exposed position in which a slate-roofer is obliged to work, is, as stated, a laborious one. Further, the nut is liable to turn around upon the bolt, and the slate, in consequence, to become loose. Both of these difficulties are obviated by means of the improved fastening here shown, which consists substantially as follows:

A, Fig. 1, represents a plate adapted to be hooked against the under side of the lath and perforated at $a$, to receive a screw, B, which is passed down through the slate and attached to the plate by screwing it thereinto, for the perforation $a$ in the plate A is not a perforation merely, but is also threaded, to enable the screw B to engage therewith. The plate A, therefore, serves not only to hook onto the lath, but also as a nut with which the screw may be made to engage. Then, after the roofer has passed the screw down through the slate and has entered it in a perforation in the plate, it is no longer necessary for him to retain his hold upon the plate, but he can operate entirely from the other side of the slate and employ both of his hands in that position, for the plate, by hooking against the lath, is not only prevented from drawing upward toward the slate, but is also prevented from being turned around as the screw is being made to engage therewith. For the same reason the plate, after the screw has been attached thereto, is prevented from turning around, and thereby become loose upon the screw.

An additional feature of the improved fastening is, as stated, its adaptability to laths of various shapes and in various positions. To this end the plate A is crimped not only at $a'$, but also at $a^2$; and in addition to the perforation $a$ it has another perforation, $a^3$. The same screw, B, however, is used as if it had but a single crimp and perforation. This enables the fastening to be used variously, as indicated by the various positions of the laths shown in Figs. 3, 4.

C, Fig. 3, represents what is termed a "T-lath." D D' D² D³, Fig. 3, represent what is termed an "L-lath." E E represent the slates. The slates are applied in the usual manner. In the case of the lath C, Fig. 3, the plate A is attached to the lath by means of the crimp $a'$, and the perforation $a$ is used in connecting the screw and plate. In the case of the lath D the crimp $a^2$ is used to connect the plate and lath, and the screw passes through the perforation $a^3$. In the case of the lath D' the crimp $a'$ and the perforation $a$ are used. In the case of the lath D² the crimp $a^2$ and the perforation $a$ are used.

In Fig. 4, in the case of the lath C, the crimp $a^2$ and perforation $a^3$ are used, and in case of the lath D, Fig. 4, two modes of connecting therewith are shown.

I claim—

1. The herein-described roofing-slate fastening, consisting of the plate A, having the crimps $a'$ and $a^2$, and the two threaded perforations $a\ a^3$, in combination with the screw B, as described.

2. The combination, substantially as described, of the slates E, the plates A, the screws B, and the laths, said plates having the two crimps and the two threaded perforations.

BERNARD M. O'NEILL.

Witnesses:
C. D. MOODY,
THOS. F. HAYDEN.